(12) United States Patent
Mindnich et al.

(10) Patent No.: US 9,613,094 B2
(45) Date of Patent: Apr. 4, 2017

(54) CONSTANT MAPPING OPTIMIZATION IN A DATABASE

(71) Applicants: Tobias Mindnich, Walldorf (DE); Christoph Weyerhaeuser, Heidelberg (DE); Johannes Merx, Heidelberg (DE)

(72) Inventors: Tobias Mindnich, Walldorf (DE); Christoph Weyerhaeuser, Heidelberg (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 14/066,496

(22) Filed: Oct. 29, 2013

(65) Prior Publication Data

US 2015/0120746 A1 Apr. 30, 2015

(51) Int. Cl.
*G06F 17/30* (2006.01)

(52) U.S. Cl.
CPC .. *G06F 17/30477* (2013.01); *G06F 17/30333* (2013.01); *G06F 17/30424* (2013.01); *G06F 17/30463* (2013.01); *G06F 17/30489* (2013.01); *G06F 17/30569* (2013.01)

(58) Field of Classification Search
CPC ......... G06F 17/30424; G06F 17/30463; G06F 17/30489; G06F 17/30569; G06F 17/30333

USPC .......................................... 707/741, 754, 756
See application file for complete search history.

(56) References Cited

U.S. PATENT DOCUMENTS

| | | | |
|---|---|---|---|
| 6,618,719 B1* | 9/2003 | Andrei | G06F 17/30471 |
| 2008/0209423 A1* | 8/2008 | Hirai | G06F 9/5027 718/102 |
| 2010/0306188 A1* | 12/2010 | Cunningham | G06F 17/30463 707/713 |
| 2012/0109934 A1* | 5/2012 | Weyerhaeuser | G06F 17/30463 707/713 |

* cited by examiner

*Primary Examiner* — Joshua Bullock
(74) *Attorney, Agent, or Firm* — Mintz Levin Cohn Ferris Glovsky and Popeo, P.C.

(57) ABSTRACT

A database server receives a query associated with a calculation scenario that defines a data flow model that includes one or more calculation nodes. Each calculation node defines one or more operations to execute on the database server, the database server comprising a column-oriented database. Thereafter, the database server instantiates the calculation scenario and executes the operations defined by the calculation nodes of the instantiated calculation scenario to result in a responsive data set having a result table with a row for each column in the column-oriented database implicated by the query having a constant value. The database server then provides the data set to the application server. Related apparatus, systems, methods, and articles are also described.

21 Claims, 13 Drawing Sheets

CONSTANT MAPPING OPTIMIZATION IN A DATABASE

TECHNICAL FIELD

The subject matter described herein relates to mapping of constant value columns in a column oriented database.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. Calculation engines can sometimes be employed by applications and/or domain specific languages in order to effect such calculations. Such calculation engines can execute calculation models/scenarios that comprise a plurality of hierarchical calculation nodes.

Calculation engines, when used with columnar data stores, can have special handling for constant columns (i.e., columns in which each row has a same value). Due to the instantiation process it can happen that only constant columns are requested at a certain calculation node. In this case, the default handling by the calculation engine is to return an empty table for this calculation node with all constant columns. However, some queries or application-features require a result also if only constant columns are requested (and, as such, the empty table is not effective). For example, a query can be run as follows in order to obtain values on a particular database graphical calculation view:
select distinct<column>FROM view
If this column matches to a constant column in the graphical calculation view the query will return an empty result. With such a query, no values are returned, however, when different queries are executed with other columns, the corresponding constant value can be returned as result. Such inconsistencies can be problematic for database users and administrators.

SUMMARY

In one aspect, a database server receives a query associated with a calculation scenario that defines a data flow model that includes one or more calculation nodes. Each calculation node defines one or more operations to execute on the database server, the database server comprising a column-oriented database. Thereafter, the database server instantiates the calculation scenario and executes the operations defined by the calculation nodes of the instantiated calculation scenario to result in a responsive data set having a result table with a row for each column in the column-oriented database implicated by the query having a constant value. The database server then provides the data set to the application server.

At least one of the calculation nodes can specify, for each constant mapping, a parameter on its input to enforce creation of the result table to have a row for a column in the column-oriented database implicated by the query that has a constant value. The query can specify a parameter to enforce creation of the result table to have a row for each column in the column-oriented database that has a constant value.

At least a portion of paths and/or attributes defined by the calculation scenario can, in some implementations, not be required to respond to the query such that the instantiated calculation scenario omits the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer with the physical table pool comprising physical tables containing data to be queried, and the logical layer defining a logical metamodel joining at least a portion of the physical tables in the physical table pool. The calculation engine can invoke an SQL processor for executing set operations.

An input for each calculation node can include one or more of: a physical index, a join index, an OLAP index, and another calculation node. Each calculation node can have at least one output table that is used to generate the data set. At least one calculation node can consume an output table of another calculation node.

In some variations, the query is forwarded to a calculation node in the calculation scenario that is identified as a default node if the query does not specify a calculation node at which the query should be executed.

The calculation scenario can include database metadata.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides rapid query response times, in particular, in connection with user interface (UI) based navigation. Furthermore, the current subject matter is advantageous in that non-empty results are always being provided to a user during UI based navigation.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
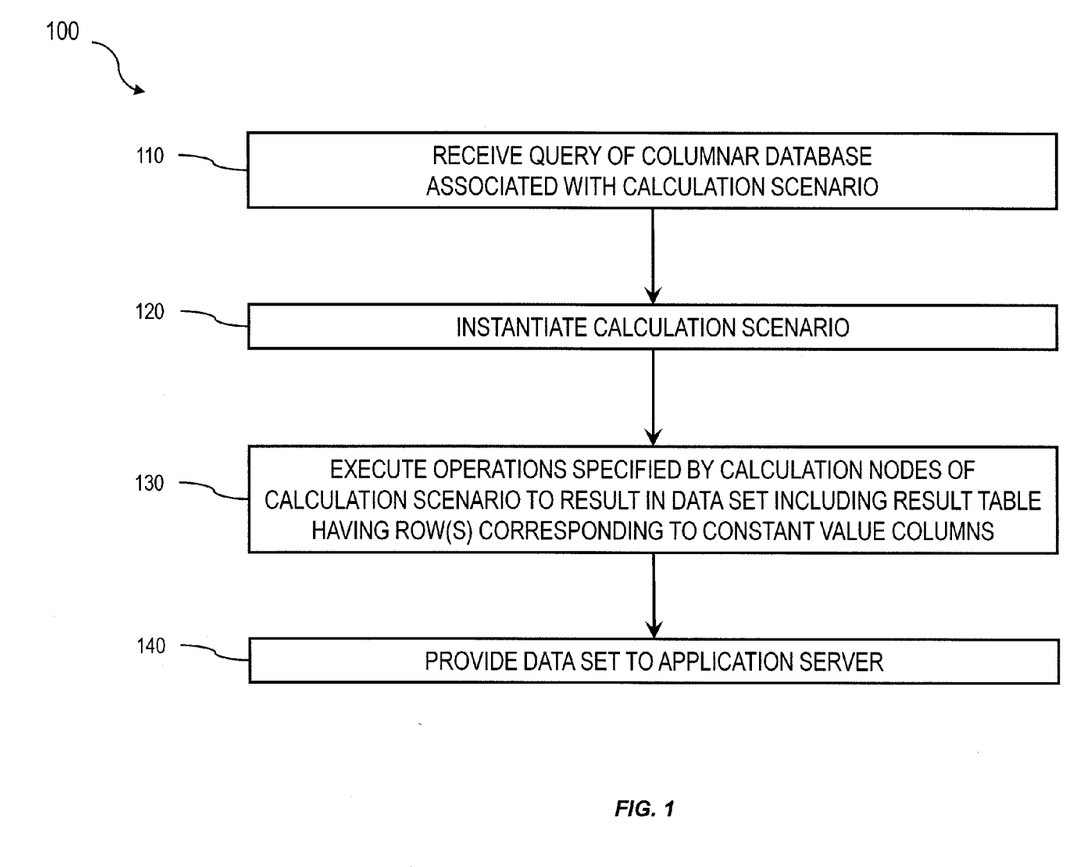
FIG. 1 is a process flow diagram illustrating a method for optimization of constant mapping in a database.

FIG. 1 is a process flow diagram 100 illustrating a method in which, at 110, a query is received by a database server from a remote application server that is associated with a calculation scenario that defines a data flow model including one or more calculation nodes. Each calculation node defines one or more operations to execute on the database server and the database server comprises a column-oriented database. Thereafter, at 120, the database server instantiates the calculation scenario. The database server subsequently, at 130, executes the operations defined by the calculation nodes of the instantiated calculation scenario to result in a responsive data set having a result table with a row for each column in the column-oriented database implicated by the query having a constant value. The database server then, at 140, provides the data set to the application server.

Figure 2:
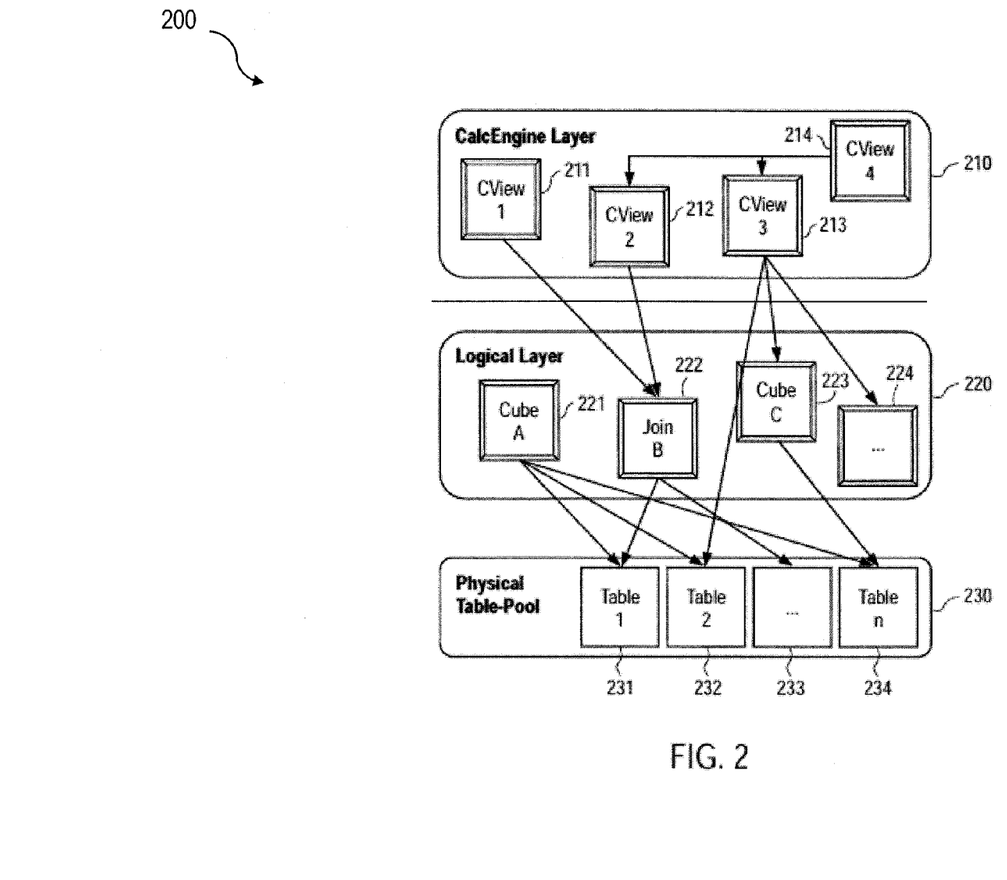
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In calculation scenarios, two different representations can be provided. First, a stored ("pure") calculation scenario in which all possible attributes are given. Second, an instantiated/executed model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Further details regarding calculation engine architecture and calculation scenarios can be found in U.S. Pat. No. 8,195,643, the contents of which are hereby fully incorporated by reference.

Figure 3:
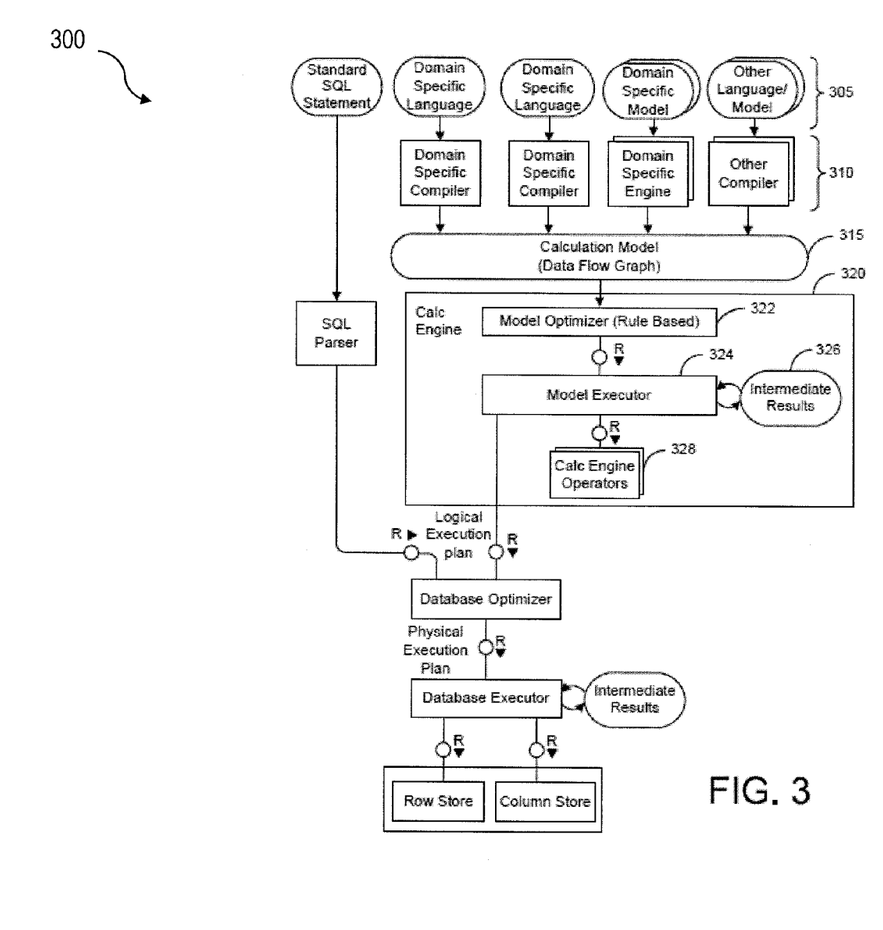
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The calculation engine 320 typically does not behave in a relational manner. The main reason for this is the instantiation process. The instantiation process can transform a stored calculation model 315 to an executed calculation model 315 based on a query on top of a calculation view which is a (catalog) column view referencing one specific node of a stored calculation model 315. Therefore, the instantiation process can combine the query and the stored calculation model and build the executed calculation model.

The main difference between a relational view or SQL with subselects and a calculation model is that the projection list in a relational view is stable also if another SQL statement is stacked on top whereas in a calculation model the projection list of each calculation node in the calculation model is depending on the projection list of the query or the parent calculation node(s).

With a calculation model 315, a user can provide a set of attributes/columns on each calculation node that can be used by the next calculation node or the query. If attributes/columns are projected in a query or on the parent calculation node, then just a subset of these requested attributes/columns can be considered in the executed calculation model.

Figure 4:
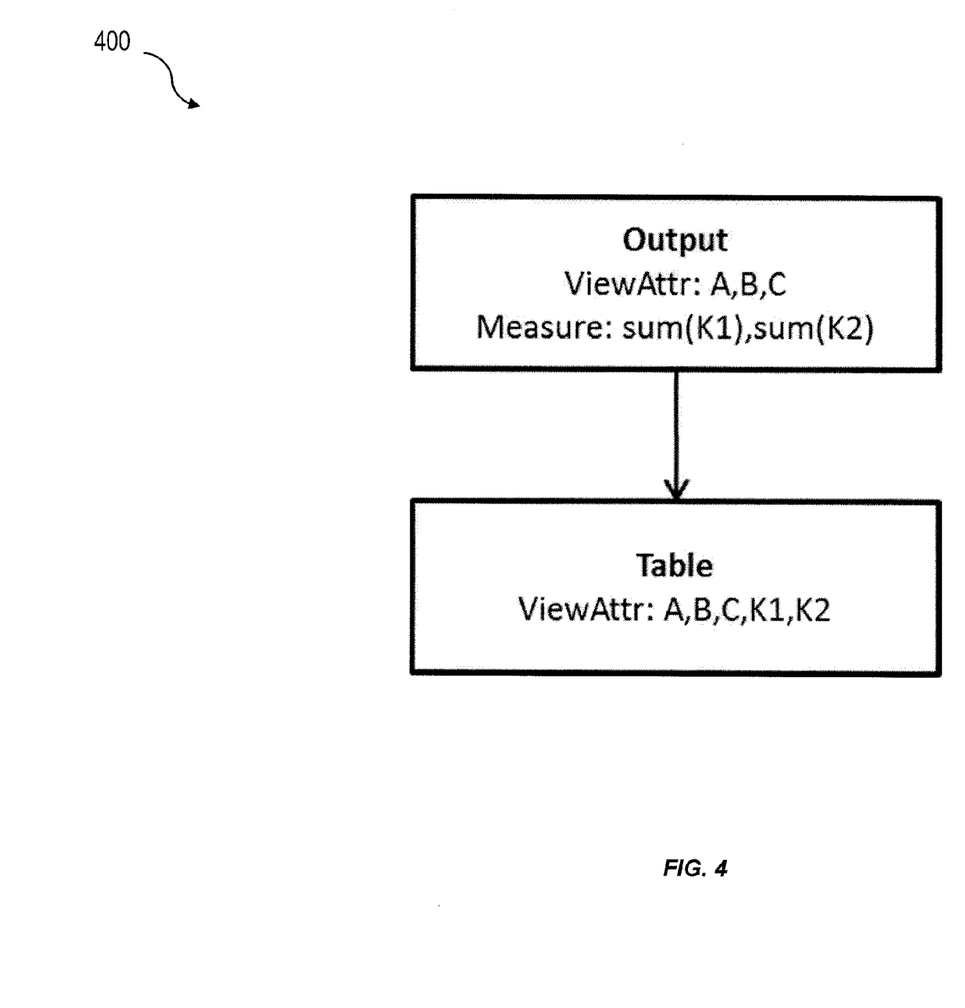
FIG. 4 is a diagram illustrating a stored calculation model for aggregation on top of a table.
Figure 5:
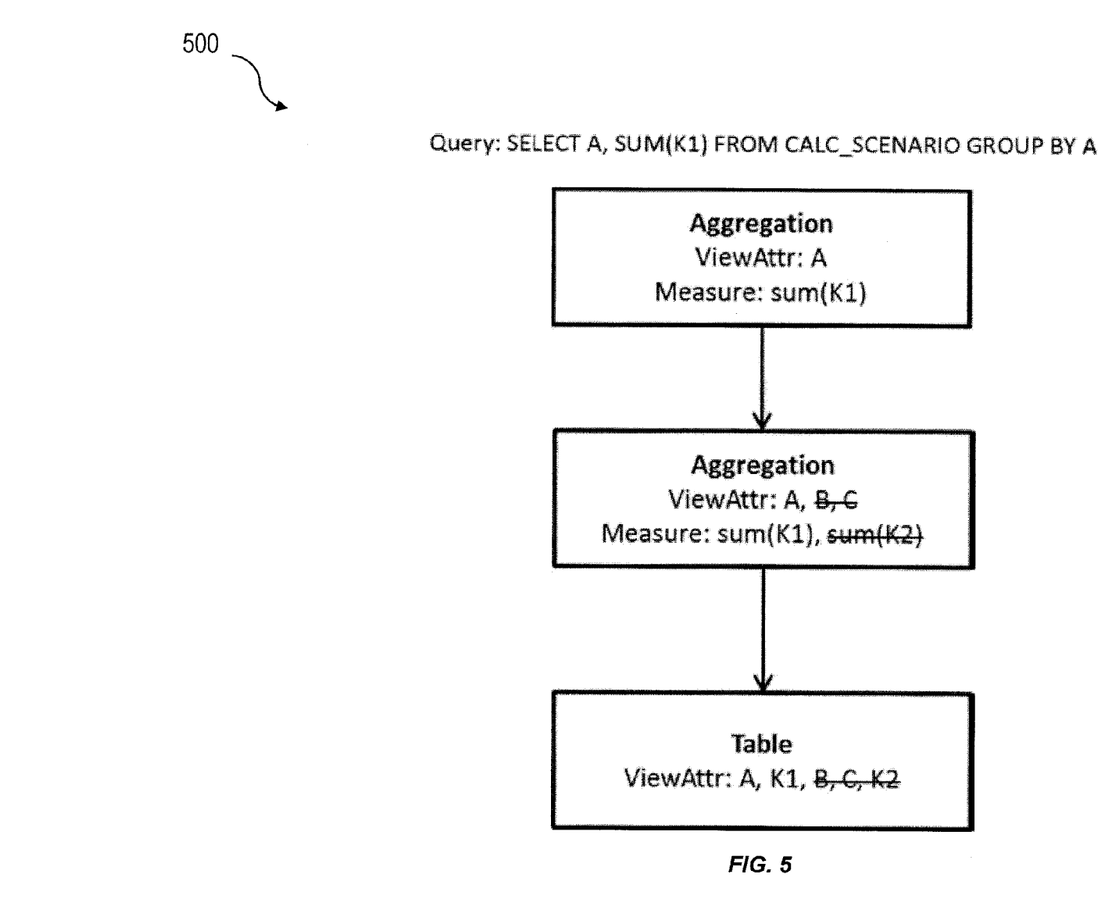
FIG. 5 is a diagram illustrating an executed calculation model corresponding to the stored calculation model of FIG. 4.

The following examples (with reference to FIGS. 4-10) illustrate the difference between a stored calculation model and an executed calculation model:

FIG. 4 shows a stored calculation model 400 for an aggregation on top of a table that is a sum of K1 and K2 across three different views A, B, C. FIG. 5 shows an executed calculation model 500 and query that corresponds to the stored calculation model 400 of FIG. 4 in which in a first table calculation node only the attributes/columns A, K1 are in the projection list and in a second table calculation node, only the attributes/columns A, B, C, K2 are in the projection list.

Figure 6:
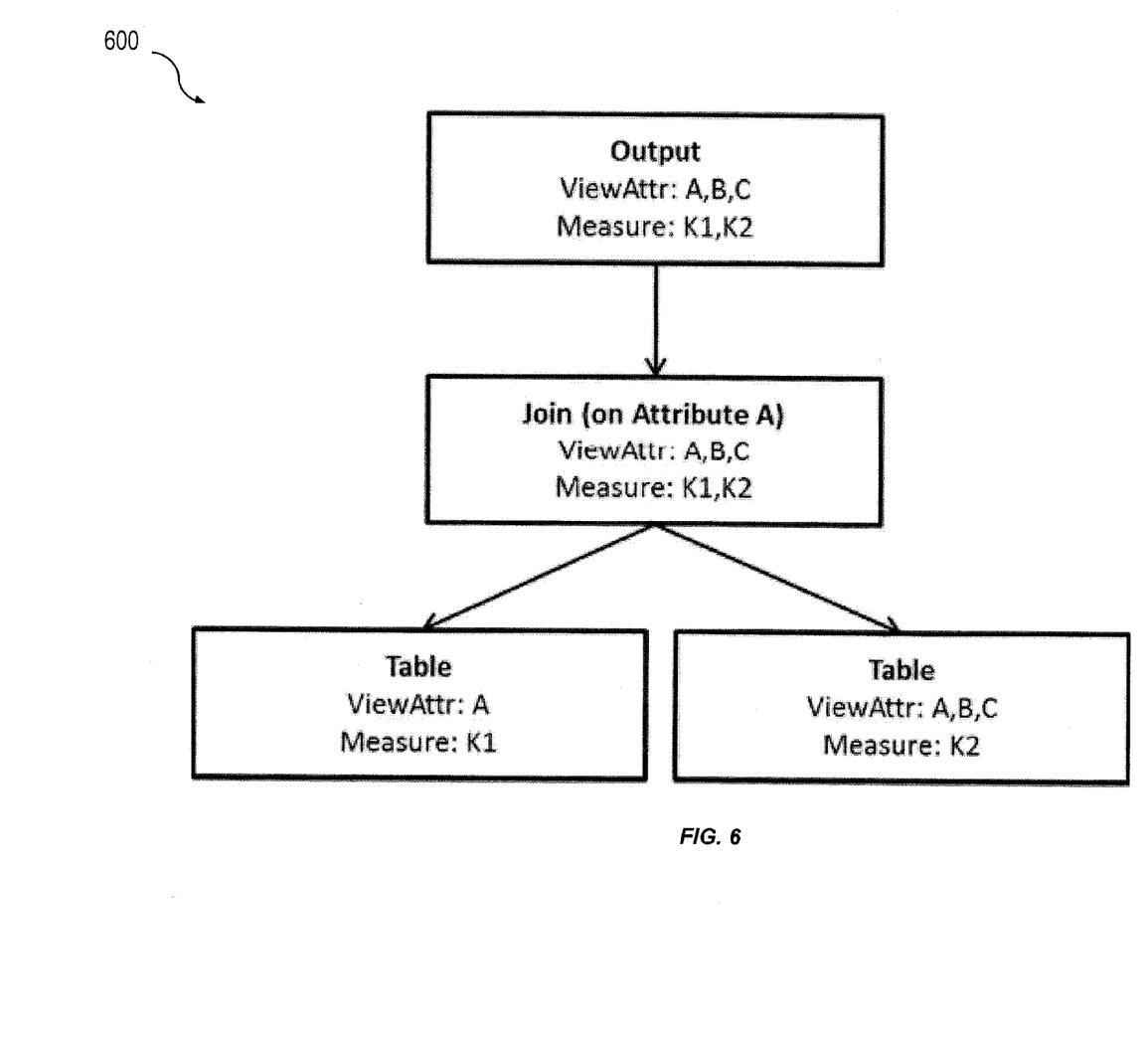
FIG. 6 is a diagram illustrating a stored calculation model for a join on top of tables.
Figure 7:
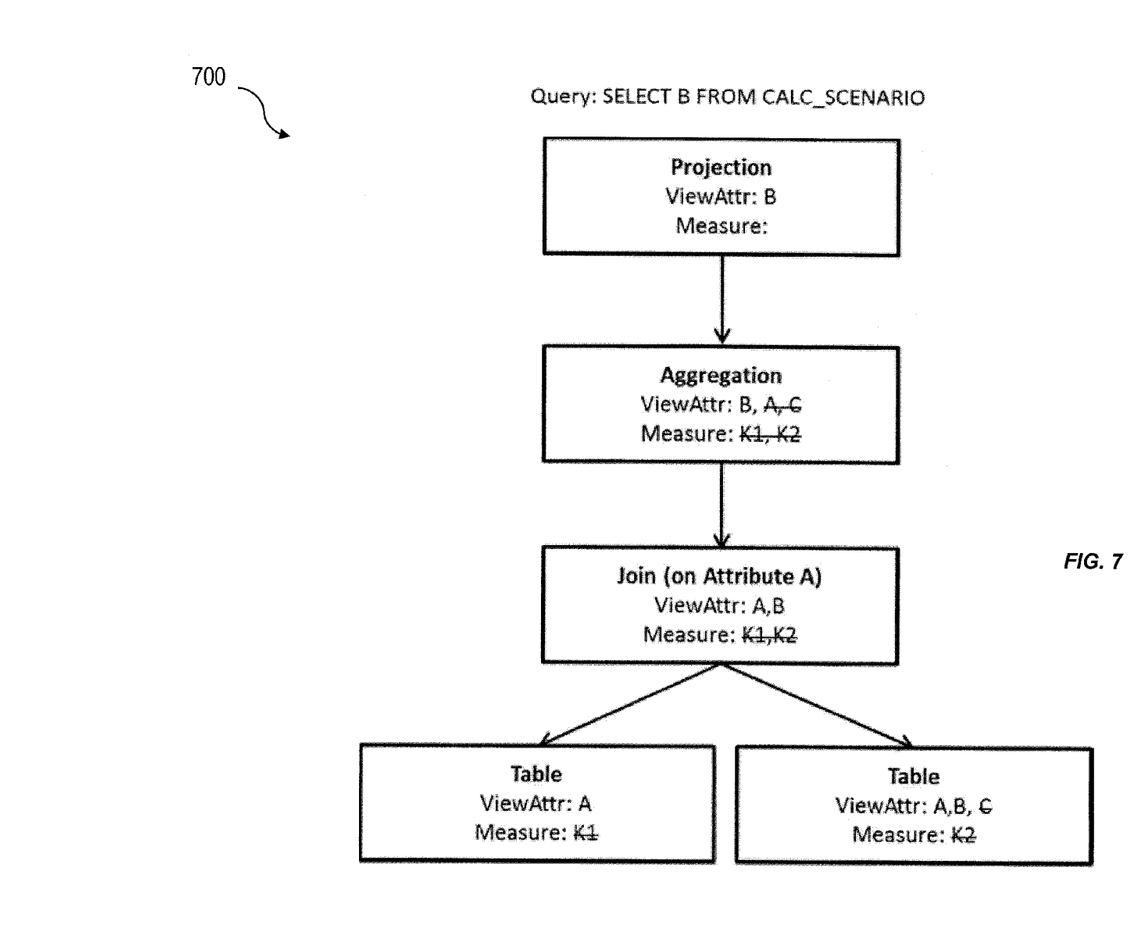
FIG. 7 is a diagram illustrating an executed calculation model corresponding to the stored calculation model of FIG. 6.

FIG. 6 shows a stored calculation model 600 for a join on top of the illustrated tables. FIG. 7 shows an executed calculation model 700 and query that corresponds to the stored calculation model 600 of FIG. 6 in which the attribute A is added to the projection list at a join node and the underlying nodes (because such an arrangement is required for joins).

Figure 8:
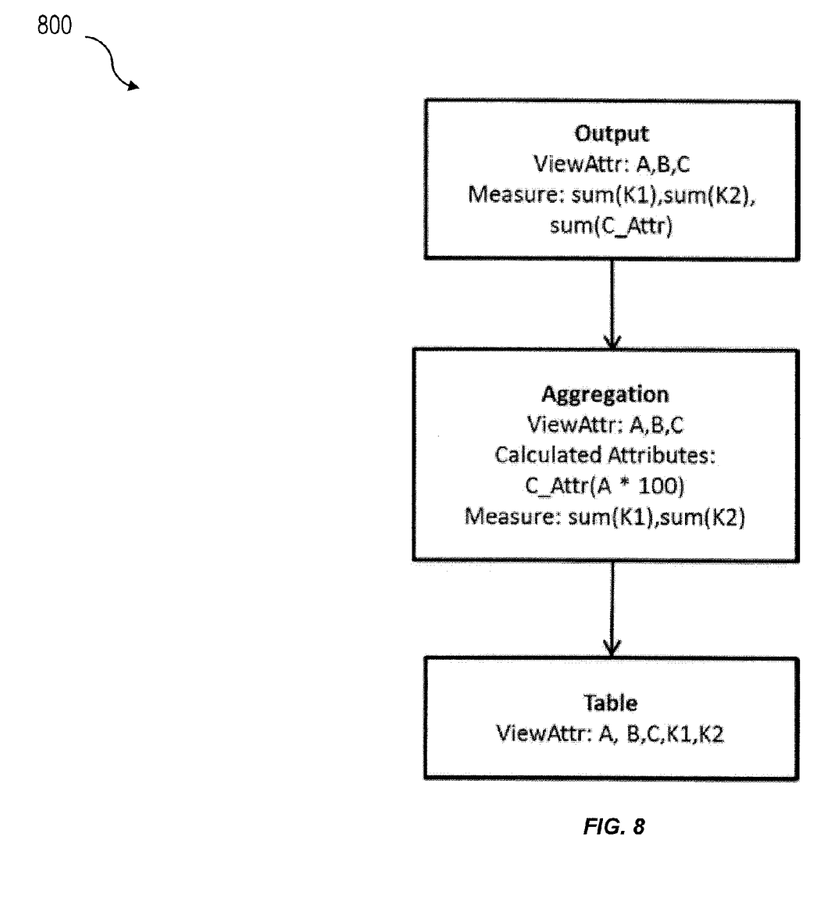
FIG. 8 is a first diagram illustrating a stored calculation model for an aggregation operation.
Figure 9:
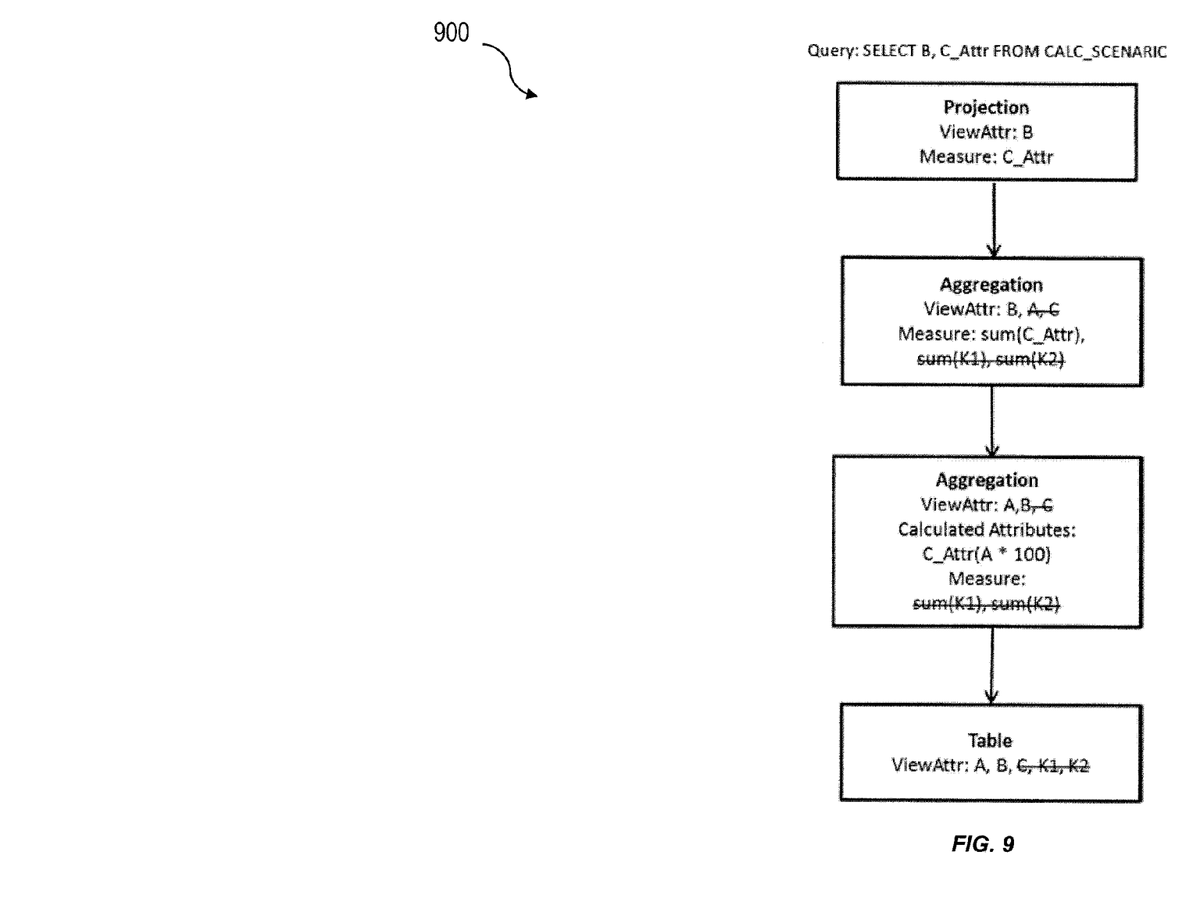
FIG. 9 is a first diagram illustrating an executed calculation model corresponding to the stored calculation model of FIG. 8.
Figure 10:
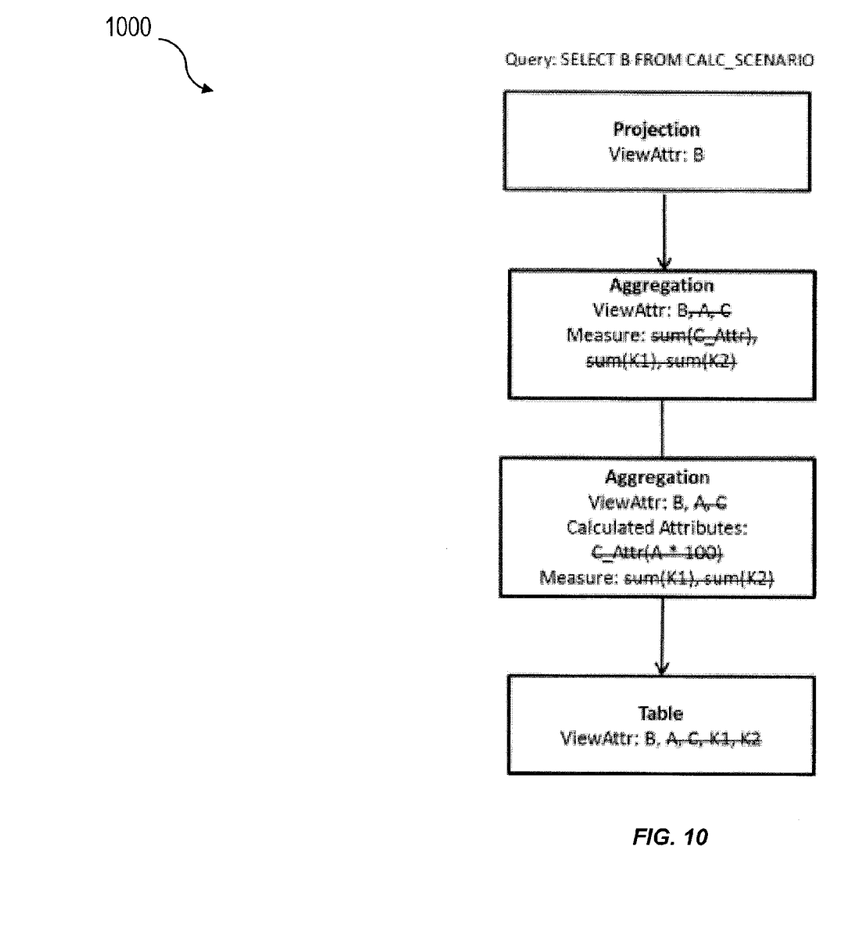
FIG. 10 is a second diagram illustrating an executed calculation model corresponding to the stored calculation model of FIG. 8.

FIG. 8 shows a stored calculation model 800 for aggregation. With this stored calculation model 800, semantics can change depending on the attributes/columns requested by the calculation engine 320. Further, with the stored calculation model 800 of FIG. 8, the aggregation calculation node defines a calculated attribute. FIG. 9 shows a first executed calculation model 900 and query that corresponds to the stored calculation model 800 of FIG. 8 in which the aggregation over the table attribute A is added to a projection list due to the calculated attribute C_Attr. FIG. 10 shows a second executed calculation model 1000 and query that corresponds to the stored calculation model 800 of FIG. 8 and in which the Attribute A is not added to the projection list of the aggregation (because the calculated attribute C_Attr. was not queried).

The calculation engine 320 can enable either the creator of a calculation model 315 or a user that runs the query to obtain the expected value. The creator of the calculation model 315 can set a special parameter on the input of a calculation node to enforce the creation of a result table (by, for example, the model optimizer 322) with one row for constant columns even if no other column is requested by the query. The user can pass a parameter with the query to also enforce this behaviour if it is not already specified in the calculation model 315. Thus, instead of creating an empty table with only the column names, the calculation engine 320 (for example, via the model optimizer 322) can create a table with one row that contains all values of the constant columns. The creation of a table with one row consumes nearly no resources during query execution because it is not necessary to query any underlying physical tables. In addition, the creation can be done without any further input as the values are already known.

There can be one parameter per constant mapping. For example, if you have three constant mappings:

C1=1
C2=2
C3=3

Only C1 and C2 can be flagged, then the following can executed:

Select C3 from view→empty result
Select C2 from view→2
Select C2, C3 from view→2, 3

The latter one (3) can be returned because the result table already has C2→2 due to the parameter on the constant mapping.

Figure 11:
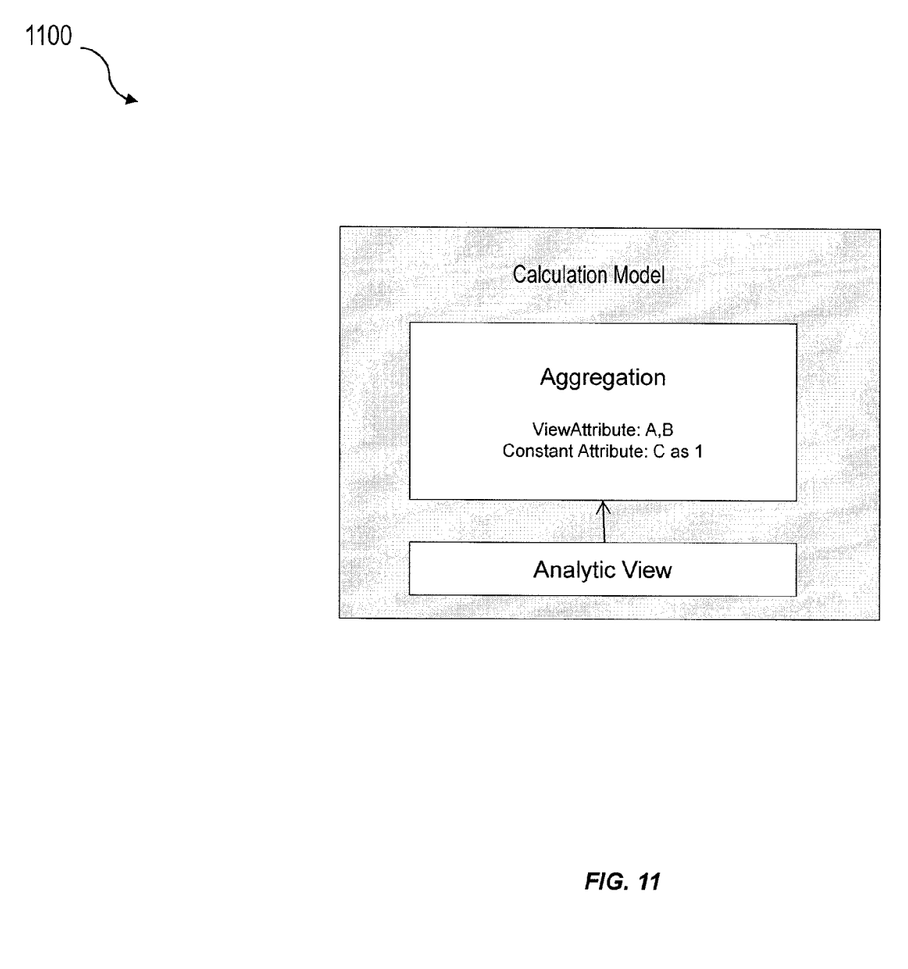
FIG. 11 is a second diagram illustrating a stored calculation model for an aggregation operation.
Figure 12:
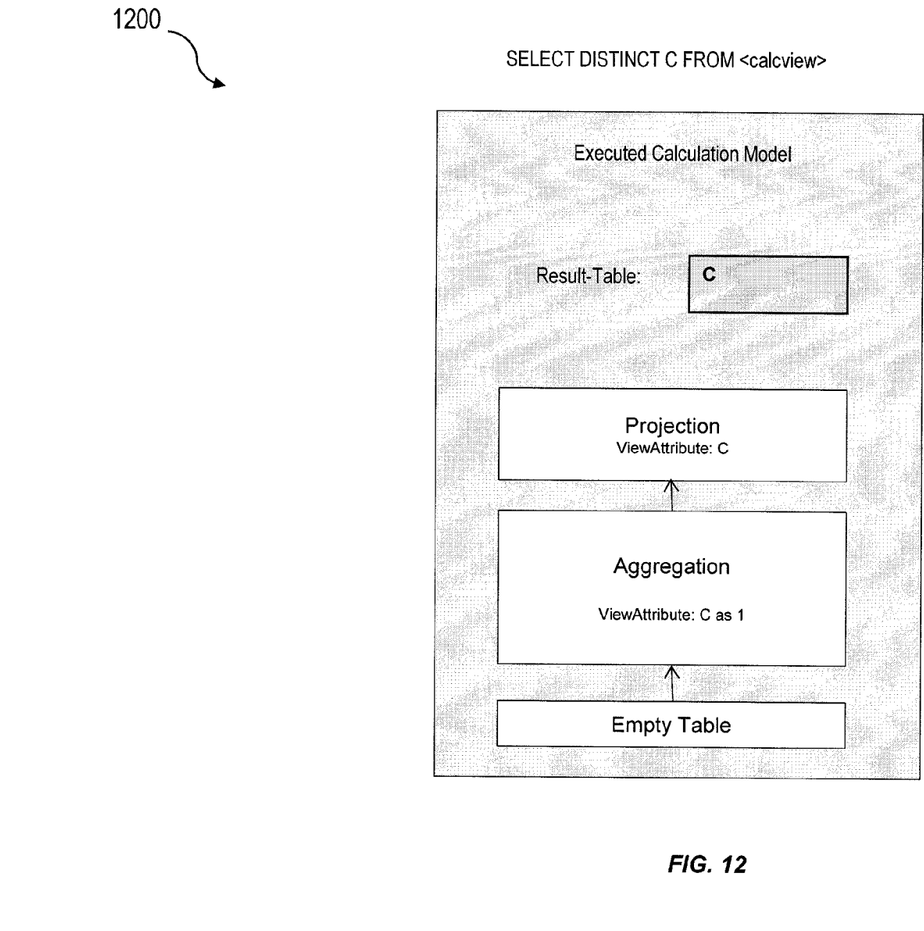
FIG. 12 is a first diagram illustrating an executed calculation model corresponding to the stored calculation model of FIG. 11.
Figure 13:
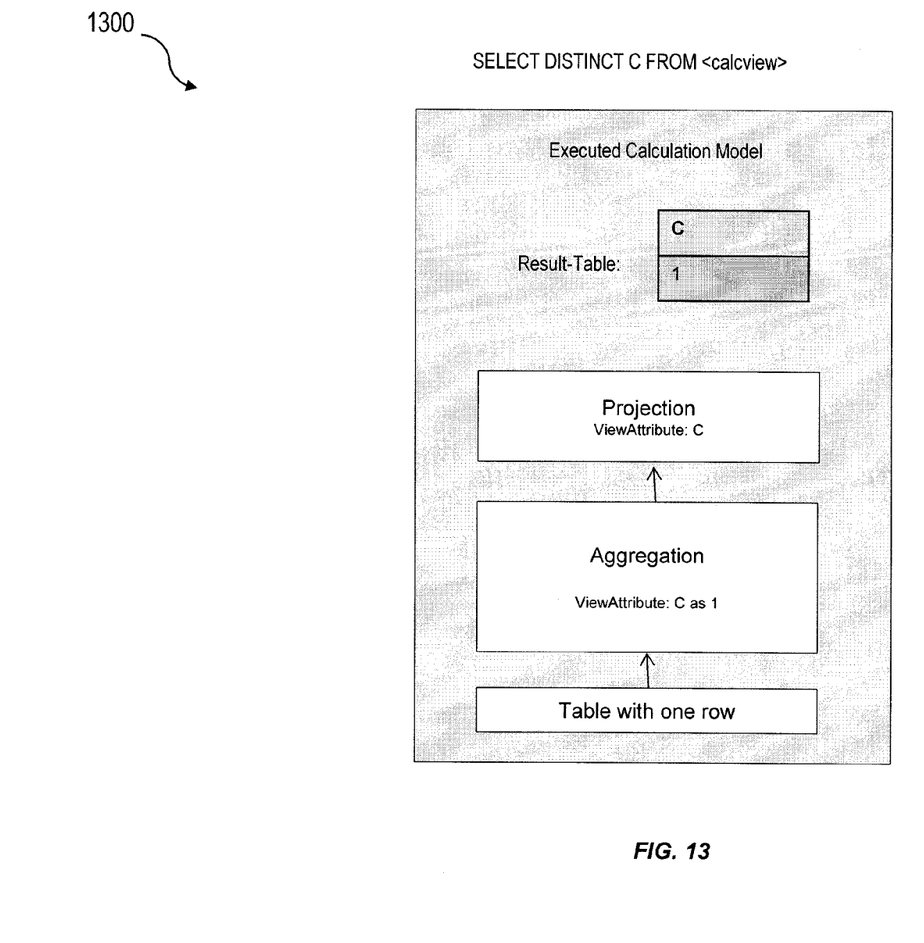
FIG. 13 is a second diagram illustrating an executed calculation model corresponding to the stored calculation model of FIG. 11.

FIG. 11 shows a stored calculation model 1100 for an aggregation of views A and B and a column C with a constant attribute 1. FIG. 12 shows an executed calculation model 1200 and query corresponding to the stored calculation model 1100 of FIG. 11. In this case, the calculation model 1200 is implemented using a conventional technique and returns a result table that only refers to attribute C. FIG. 13, in contrast, shows an executed calculation model 1300 and query (implemented as described herein) that also corresponds to the stored calculation model 1100 of FIG. 11, but returns a complete result table referring to attribute C as well as the constant value 1. As can be seen, the aggregation in the executed calculation model 1200 of FIG. 12 is on top of an empty table while the aggregation in the executed calculation model 1300 of FIG. 13 is on top of a table with a single row. The latter arrangement ensures that the result table includes a result table with a row for any constant columns.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
receiving, at a database server, a query associated with a calculation scenario, wherein the query is received from a remote application server, wherein the calculation scenario defines a data flow model that includes one or more calculation nodes, wherein each calculation node defines one or more operations to execute on the database server, wherein the database server comprises a column-oriented database that includes at least a first constant column, and wherein each row of the first constant column has a same value;
instantiating, by the database server, the calculation scenario;
executing, by the database server, the operations defined by the calculation nodes of the instantiated calculation scenario, wherein the executing of the operations results in a responsive data set that includes a result table, wherein the result table includes a first row corresponding to the first constant column, when the first constant column is implicated by the query, and wherein the first row has the same value that is in each row of the first constant column; and
transmitting, by the database server, the data set, wherein the data set is transmitted to the application server.

2. A method as in claim 1, wherein at least one of the calculation nodes specifies, for each mapping of at least the first constant column, a parameter on its input to enforce creation of the result table having the first row corresponding to the first constant column, when the first constant column is implicated by the query.

3. A method as in claim 1, wherein the query specifies a parameter to enforce creation of the result table having the first row for the first constant column implicated by the query having the same value.

4. A method as in claim 1, wherein at least a portion of paths and/or attributes defined by the calculation scenario are not required to respond to the query, and wherein the instantiated calculation scenario omits the paths and attributes defined by the calculation scenario that are not required to respond to the query.

5. A method as in claim 1, wherein at least one of the calculation nodes filters results obtained from the database server.

6. A method as in claim 1, wherein at least one of the calculation nodes sorts results obtained from the database server.

7. A method as in claim 1, wherein the calculation scenario is instantiated in a calculation engine layer by a calculation engine.

8. A method as in claim 7, wherein the calculation engine layer interacts with a physical table pool and a logical layer, the physical table pool comprising physical tables containing data to be queried, and the logical layer defining a logical metamodel joining at least a portion of the physical tables in the physical table pool.

9. A method as in claim 7, wherein the calculation engine invokes a structured query language (SQL) processor for executing set operations.

10. A method as in claim 1, wherein an input for each calculation node comprises one or more of: a physical index, a join index, an OLAP index, and another calculation node.

11. A method as in claim 10, wherein each calculation node has at least one output table that is used to generate the data set.

12. A method as in claim 11, wherein at least one calculation node consumes an output table of another calculation node.

13. A method as in claim 1, wherein the executing comprises:
forwarding, to a default calculation node in the calculation scenario, the query, when the query does not specify a calculation node at which the query should be executed.

14. A method as in claim 1, wherein the calculation scenario comprises database metadata.

15. A method as in claim 1, wherein the column-oriented database further includes a second constant column, wherein the result table further includes a second row corresponding to the second constant column.

16. A database system comprising:
an application server in communication with and remote from the database server, the application server comprising memory and at least one data processor;
a database server comprising at least one data processor and memory storing instructions that, when executed by the at least one data processor, causes the at least one data processor to perform operations comprising:
receiving, from the application server, a query associated with a calculation scenario, wherein the calculation scenario defines a data flow model that includes one or more calculation nodes, wherein each calculation node defines one or more operations to execute on the database server, wherein the database server comprises a column-oriented database that includes at least a first constant column, and wherein each row of the first constant column has a same value;
instantiating the calculation scenario;
executing the operations defined by the calculation nodes of the instantiated calculation scenario, wherein the executing of the operations results in a responsive data set that includes a result table, wherein the result table includes a first row corresponding to the first constant column, when the first constant column is implicated by the query, and wherein the first row has the same value that is in each row of the first constant column; and
transmitting, to the application server, the data set.

17. A database system as in claim 16, further comprising one or more additional application servers coupled to the database server.

18. A database system as in claim 16, wherein the database server further comprises a calculation engine layer, a logical layer, and a physical table pool.

19. A database system as in claim 16, wherein at least a portion of paths and/or attributes defined by the calculation scenario are not required to respond to the query, and wherein the instantiated calculation scenario omits the paths and attributes defined by the calculation scenario that are not required to respond to the query.

20. A database system as in claim 16, wherein the calculation scenario is instantiated in a calculation engine layer by a calculation engine, wherein the calculation engine layer interacts with a physical table pool and a logical layer, the physical table pool comprising physical tables containing data to be queried, and the logical layer defining a logical metamodel joining at least a portion of the physical tables in the physical table pool, wherein an input for each calculation node comprises one or more of: a physical index, a join index, an OLAP index, and another calculation node; wherein each calculation node has at least one output table that is used to generate the final result set.

21. A non-transitory computer program product storing instructions, which when executed by at least one data processor of at least one computing system, result in operations comprising:

receiving a query associated with a calculation scenario, wherein the calculation scenario defines a data flow model that includes one or more calculation nodes, wherein each calculation node defines one or more operations to execute on a database server, wherein the database server comprises a column-oriented database that includes at least a first constant column, and wherein each row of the first constant column has a same value;

instantiating the calculation scenario;

executing the operations defined by the calculation nodes of the instantiated calculation scenario, wherein the executing of the operations results in a responsive data set that includes a result table, wherein the result table includes a first row corresponding to the first constant column, when the first constant column is implicated by the query, and wherein the first row has the same value that is in each row of the first constant column; and transmitting the data set in response to the query.

* * * * *